United States Patent [19]

Inui et al.

[11] Patent Number: 4,543,844
[45] Date of Patent: Oct. 1, 1985

[54] TRANSMISSION MANIPULATION DEVICE FOR MANUAL TRANSMISSION

[75] Inventors: Masaki Inui; Yasuyoshi Yasui, both of Toyota, Japan

[73] Assignee: Toyota Jidosha Kabushiki Kaisha, Japan

[21] Appl. No.: 454,013

[22] Filed: Dec. 28, 1982

Related U.S. Application Data

[62] Division of Ser. No. 397,442, Jul. 12, 1982, Pat. No. 4,494,419.

[30] Foreign Application Priority Data

Aug. 20, 1981 [JP] Japan ................... 56-131946
Sep. 2, 1981 [JP] Japan ................... 56-138838

[51] Int. Cl.⁴ .................... G05G 9/18; G05G 5/10
[52] U.S. Cl. ..................... 74/473 R; 74/477
[58] Field of Search ............. 74/473 R, 475, 477

[56] References Cited

U.S. PATENT DOCUMENTS

| | | | |
|---|---|---|---|
| 4,193,316 | 3/1980 | Kelbel | 74/477 |
| 4,307,624 | 12/1981 | Mylenek | 74/477 |
| 4,377,951 | 3/1983 | Magg et al. | 74/475 X |

*Primary Examiner*—Allan D. Herrmann

*Attorney, Agent, or Firm*—Parkhurst & Oliff

[57] ABSTRACT

A transmission manipulation device for a manual transmission includes a single main fork shaft provided in a main chamber of a transmission case, a plurality of shift forks axially movably mounted on the main fork shaft and associated with respective transmission clutch mechanisms, a shift and select lever shaft axially movably and rotatably provided in the main chamber to extend in the direction perpendicular to the main fork shaft, an auxiliary fork shaft provided in an auxiliary chamber of the transmission case to extend in parallel with the main fork shaft, and a shift fork fixed to the auxiliary fork shaft and associated with a transmission clutch mechanism in the auxiliary chamber. The shift and select lever shaft has a projection which is selectively engageable with the engaging portion of any one of the shift forks as the lever shaft is moved in the axial direction and rotation of the lever shaft causes movement of any one of the shift forks in the axial direction of the main fork shaft. The projection of the lever shaft is selectively engageable with an engaging portion which is provided on the auxiliary fork shaft and arranged in side-by-side relation to the engaging portions of the shift forks mounted on the main fork shaft.

1 Claim, 5 Drawing Figures

TRANSMISSION MANIPULATION DEVICE FOR MANUAL TRANSMISSION

This is a division of prior co-pending application Ser. No. 397,442, filed July 12, 1982, now U.S. Pat. No. 4,494,419.

BACKGROUND OF THE INVENTION

The present invention relates to a transmission manipulation device for use in manual transmission.

Such a manual transmission has been known as having a transmission case in which there are defined a main chamber and an auxiliary chamber, the main chamber accomodating a plurality of transmission clutch mechanisms while the auxiliary chamber accomodates a single transmission mechanism. This type of manual transmission needs a fork shaft for each of the clutch mechanisms. For instance, in this type of manual transmission, the main chamber of the case accomodates a clutch mechanism for the first and second speed gears and a clutch mechanism for the third and fourth speed gears while a clutch mechanism for fifth speed gear is disposed in the auxiliary chamber of the transmission case. In this transmission, it is necessary to employ three fork shafts. Thus, in the transmission having transmission clutch mechanisms accomodated by the main and auxiliary chambers, the construction is rendered complicated to make the assembling troublesome while increasing the weight of the transmission undesirably.

SUMMARY OF THE INVENTION

Accordingly, an object of the invention is to provide a transmission manipulation device in which each of the main and auxiliary chambers in a case accomodates only one fork shaft, thereby to simplify the construction and the assembling work while reducing the weight of the transmission.

To this end, according to the invention, a plurality of shift forks for transmission clutch mechanisms are mounted on a single main fork shaft provided in the main chamber of the case, and a shift and select lever shaft is accomodated by the main chamber in a manner to be able to select and shift the shift fork, while the auxiliary chamber accomodates an auxiliary fork shaft extending in parallel with the main fork shaft through the main chamber. Shift forks for the transmission clutch mechanisms are fixed to the auxiliary fork shaft which in turn is selected and shifted by the shift and select lever shaft.

The above and other objects, features and advantages of the invention will become apparent from the following description of preferred embodiments taken in conjunction with the accompanying drawings.

DESCRIPTION OF THE PREFERRED EMBODIMENTS

Figure 1:
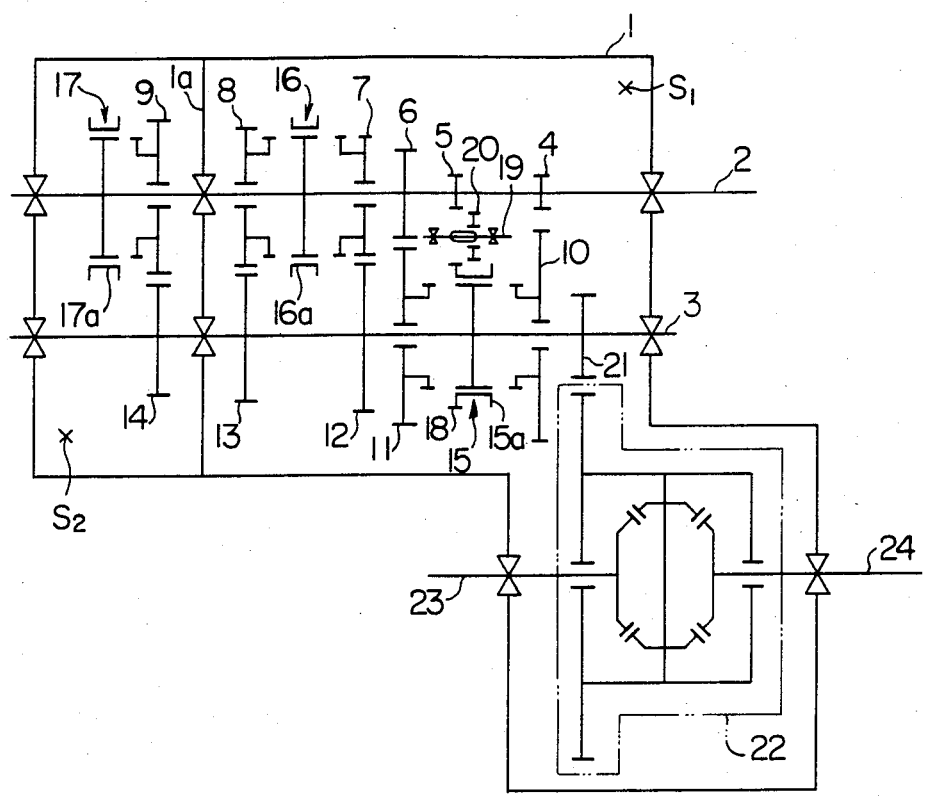
FIG. 1 is a schematic diagram of a manual transmission.

A preferred embodiment of the invention will be described hereinunder with reference to the attached drawings. First of all, a manual transmission having five forward speed gears and one reverse gear, to which the invention pertains, will be explained with reference to the schematic diagram shown in FIG. 1. The transmission has a case 1 in which there are formed a main chamber $S_1$ and an auxiliary chamber $S_2$ separated by wall 1a. The case 1 rotatably carries an input shaft 2 and an output shaft 3 arranged in parallel with each other so as to extend through the chambers $S_1$ and $S_2$. First speed gear 4, reverse gear 5 and second speed gear 6 are fixed to the portion of the input shaft 2 within the main chamber $S_1$ in the mentioned order from the right side as viewed in the drawing. Third speed gear 7 and fourth speed gear 8 also are carried by the above-mentioned portion of the input shaft 2 but these gears are rotatable on the input shaft 2. A fifth gear 9 is rotatably carried by the portion of the input shaft 2 within the auxiliary chamber $S_2$. On the other hand, the portion of the output shaft 3 within the main chamber $S_1$ rotatably carries counter gears 10 and 11 normally meshing with the first speed gear 4 and the second speed gear 6 while counter gears 12 and 13 normally meshing with the third and fourth speed gears 7 and 8 are fixed to the same. A counter gear 14 normally meshing with the fifth speed gear 9 is fixed to the portion of the output shaft 3 within the auxiliary chamber $S_2$. The counter first gear 10 and counter second gear 11 are adapted to rotate as a unit with the output shaft 3 as a driving connection therebetween is established by the sleeve 15a of a first transmission clutch mechanism 15 while the third speed gear 3 and fourth speed gear 8 are adapted to rotate as a unit with the input shaft 2 as a driving connection therebetween is established by the sleeve 16a of a second transmission clutch mechanism 16. Also, the fifth speed gear 9 is adapted to be rotated as a unit with the input shaft 2 as a driving connection therebetween is established by the sleeve 17a of a third transmission clutch mechanism 17. Through this transmission, the rotation of the input shaft 2, which is driven by the engine (not shown) through the clutch, is transmitted to the output shaft 3 at the selected speed reduction ratio. A counter reverse gear 18 is provided on the outer periphery of the sleeve 15a of the first clutch mechanism 15 while a reverse idler shaft 19 rotatably mounted within the main chamber $S_1$ of the case 1 carries a reverse idler gear 20 axially movably and corotatably, i.e., for a rotation as a unit with the reverse idler shaft 19. With this arrangement, as the idler gear 20 axially moves to mesh with the reverse gear 5 and the counter reverse gear 18 simultaneously, the rotation of the input shaft 2 is transmitted to the output shaft 3 in the reverse direction. Rotation of the output shaft 3 is transmitted first to a differential gear 22 through the drive gear 21 on the output shaft 3 and then to the left and right drive shafts 23 and 24. In FIG. 1, the transmission is shown as being in the neutral position in which rotation of the input shaft 2 is not transmitted to the output shaft 3.

A description will be made hereinunder as to the transmission manipulation device by which the speed changing operation is effected through movement of the clutch sleeves 15a to 17a of the clutch mechanisms 15 to 17, with reference to FIGS. 2 to 5.

Figure 2:
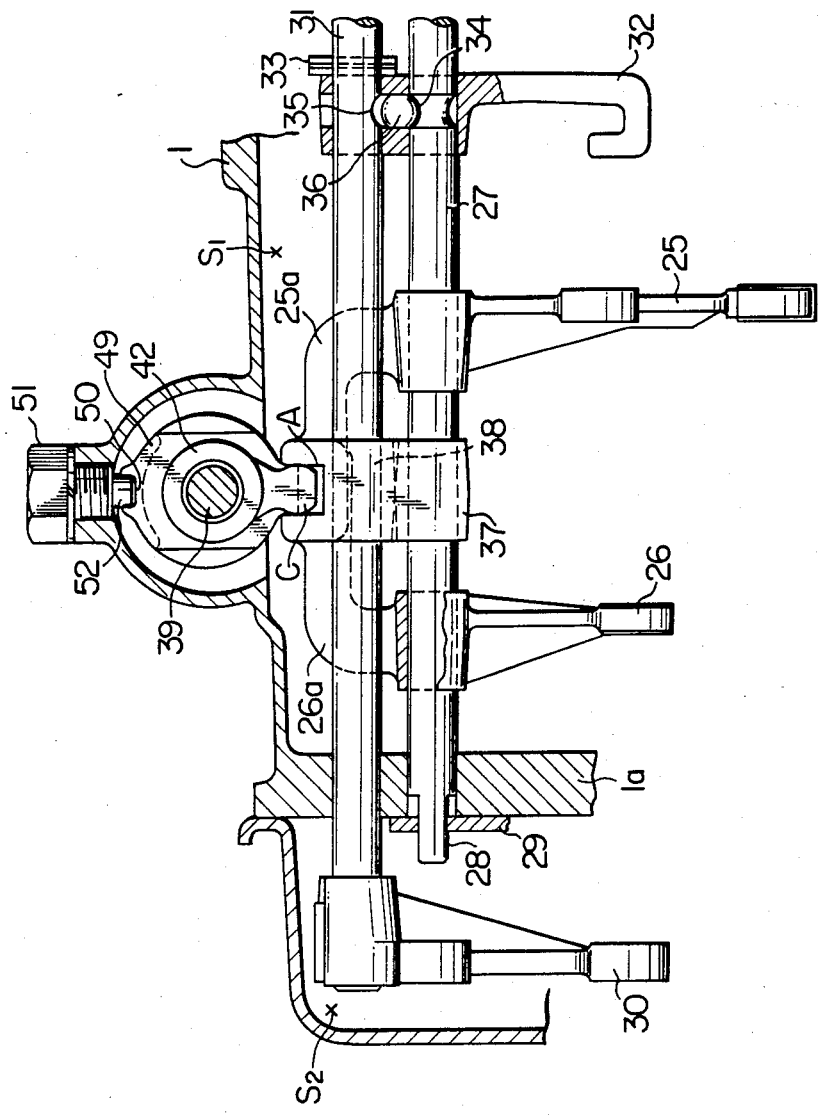
FIG. 2 is a front elevational sectional view of a transmission manipulation device.
Figure 3:
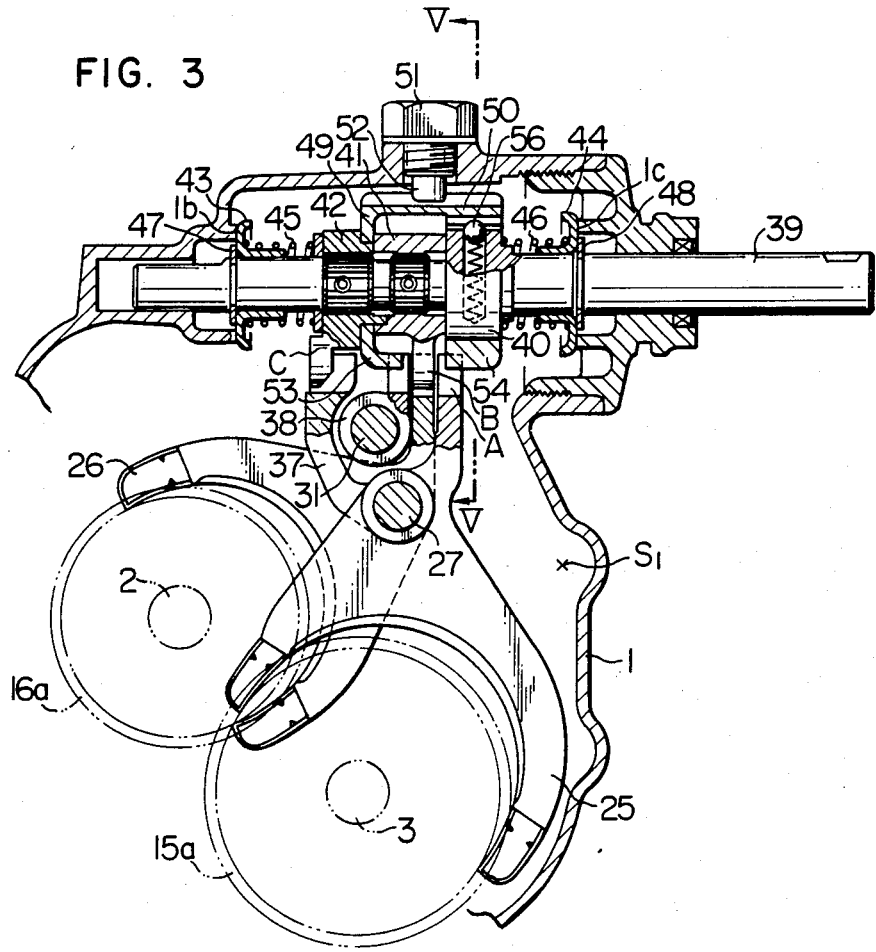
FIG. 3 is a side elevational sectional view of the transmission manipulation device.

As shown in FIGS. 2 and 3, shift forks 25 and 26 are arranged so as to engage with the sleeves 15a and 16a of the first and second clutch mechanisms 15 and 16, respectively, in a manner to permit these sleeves 15a and 16a to rotate and move in the axial direction. The first shift fork 25 and second shift fork 26 are axially movably mounted on a main fork shaft 27 which in turn is axially movably mounted within the main chamber S₁ of the case 1 in parallel with the input shaft 2. The left end of the fork shaft 27 as viewed in FIG. 2 is provided with two flat surfaces 28 and is prevented from rotation by means of a retainer 29 secured to an intermediate wall 1a of the casing 1. Also, a third shift fork 30 engages with the sleeve 17a of the third clutch mechanism 3 in a manner to permit the sleeve 17a to rotate and move axially. The shift fork 30 is fixed to an auxiliary fork shaft 31 which is axially movably mounted on the case 1 to extend through the intermediate wall 1a of the case 1. The fork shaft 31 extends in parallel with the shaft 27 at the front upper side thereof (left upper side as viewed in FIG. 3). A reverse shift arm 32 is axially movably carried by the right ends of two fork shafts 27 and 31, and is connected to the reverse idler gear 20 in a manner to permit the gear 20 to rotate and move axially. The shift arm 32 is restrained from moving to the right by means of a retaining pin 33 which is secured to the auxiliary fork shaft 31. The arm 32 is provided with a one-way pin 36 which is engageable with opposing engaging grooves 34 and 35 formed in both fork shafts 27 and 31. With this arrangement, when the retaining pin 33 moves the shift arm 32 together with the auxiliary fork shaft 31 upon the leftward movement thereof, the one-way pin 36 leaves the engaging groove 34 in the main fork shaft 27, which is held stationary, to move upward into engagement with the engaging groove 35 of the auxiliary fork shaft 31. Therefore, when the auxiliary fork shaft 31 is returned, the shift arm 32 is moved together with the fork shaft 31. Upon the rightward movement of the auxiliary fork shaft 31 and upon the movement of the first fork shaft 27 to the left and right, the one-way pin 36 engages the engaging groove of the shaft, which is held stationary, thereby to hold the reverse shift arm stationary.

Figure 4:
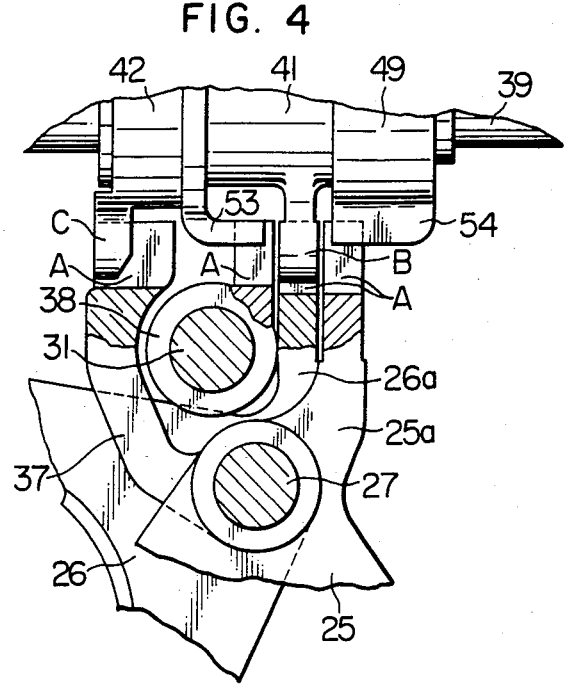
FIG. 4 is an enlarged view of the connection between the lever shaft and the fork shaft.
Figure 5:
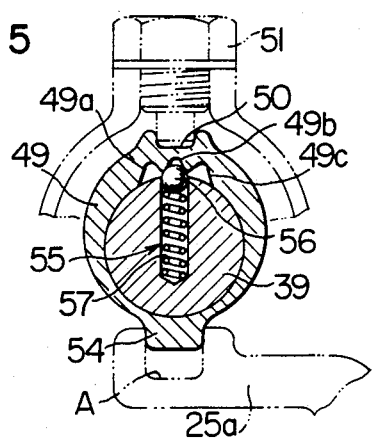
FIG. 5 is a sectional view taken along the line V—V of FIG. 3.

A first shift head 37 is fixed to the main fork shaft 27 between the first shift fork 25 and the second shift fork 26. A second shift head 38 is fixed to the auxiliary fork shaft 31 behind the first shift head 37. A head portion 26a disposed rearwardly from the second shift head 38 is formed on the second shift fork 26, while a head portion 25a disposed rearwardly from the head portion 26a of the second shift fork 26 is provided on the first shift fork 25. The shift heads 37, 38 and head portions 25a, 26a are formed with engaging grooves A—A as shown in FIG. 4. When the transmission is in the neutral position, the engaging grooves A—A are aligned on a line which intersects the fork shaft at a right angle.

The case 1 carries rotatably and axially movably also a shift and select lever shaft 39 which extends above the fork shafts 27 and 31 perpendicularly to the shafts 27 and 31. The lever shaft 39 is axially moved by the selecting operation of the shift lever (not shown) through a remote mechanism, and is rotated by the shifting operation of the shift lever through the remote mechanism. A large diameter portion 40 is formed on the central portion of the lever shaft 39. First inner lever 41 and second inner lever 42 are fixed to the lever shaft 39 at the front side of the portion 40 in a side-by-side relation. Front and rear washers 43 and 44 are fixed to both ends of the lever shaft 39 for axial movement. Front and rear return springs 45 and 46 are provided between the front washer 43 and the second inner lever 42 and between the rear washer 44 and the portion 40, respectively. The washers 43 and 44 are prevented from coming off from the lever shaft 39 by the front and rear snap springs 47 and 48 attached to both ends of the lever shaft 39. The washers 43 and 44, on the other hand, abut the front and rear walls 1b and 1c of the case 1, thereby to hold the lever shaft 39 in the neutral position. The first inner lever 44 is provided with a first projection B which extends downwardly and engages, when the lever shaft 39 is in the neutral position, with the engaging groove A in the second shift fork 26, as shown in FIG. 4. Another projection C projects downwardly from the second inner lever 41, and is allowed to engage with the engaging groove A in the second shift fork 26, as shown in FIG. 4. Another projection C projects downwardly from the second inner lever 41, and is allowed to engage with the engaging groove A of the first shift head 37 only when the first inner lever 41 is in engagement with the engaging groove A of the first shift fork 25 or the engaging groove A of the second shift fork 26. The lever shaft 39 has an interlock plate 49 which covers the first inner lever 41 and permits the lever shaft 39 to rotate. A groove 50 is formed in the upper surface of the interlock plate 49 to extend in the axial direction of the lever shaft 39. The groove 50 is adapted to be engaged by the end 52 of the lock bolt 51 which is screwed in the upper portion of the case 1, so as to prevent the rotation of the interlock plate 49. As shown in FIG. 4, front and rear projections 53 and 54 are formed to interpose therebetween the projection B of the first inner lever 41. These retaining projections 53 and 54 are adapted to engage with the engaging grooves A—A which are not engaged by the projection B of the inner lever 41 or by the projection C of the inner lever 42. Namely, when the lever shaft 39 is in the neutral position, the projections 53 and 54 serve to hold the second shift head 38 and first shift fork 25 immovable. However, when the first inner lever 41 engages with the first shift fork 25, the projections 53 and 54 hold the second shift fork 26 and second shift head 38 immovable. Also, when the first inner lever 41 is in engegement with the second shift head 38, the projections 53 and 54 hold the first shift head 37, first shift fork 25 and second shift fork 26 immovable. A latch mechanism provided on the shaft 39 at a portion thereof near the large diameter portion 40 has a ball 56 which is pressed into one of the three engaging grooves 49a to 49c in the inner peripheral surface of the interlock plate 49 by the biasing force of the spring 57, thereby to hold the lever shaft 39 in a selected rotational position (see FIG. 5).

In the transmission manipulation device having the construction explained hereinbefore, the first speed position is attained in a manner explained hereinunder. When a selecting operation is effected by moving the shift and select lever shaft 39 rearwardly, as viewed in FIG. 3, from the neutral position against the force of the return spring 46, the projection B of the first inner lever 41 is brought into engagement with the engaging groove A of the first shift fork 25. Then, as a shifting operation is effected by rotating the lever shaft 39 counter-clockwise as viewed in FIG. 2, the first shift fork 25 is moved to the right, so that the sleeve 15a of the first clutch mechanism 15 is connected to the counter first gear 10. Since the shifting operation is effected with the projection C of the second inner lever 42 engaging the engaging groove A of the main shift head 37, the first shift fork 25 and main fork shaft 27 are moved as a unit as the lever shaft 39 is rotated. In this state, the second shift fork 26 and second shift head 38 are rendered stationary since the engaging grooves A, A thereof are engaged by the projection 53 of the interlock plate 49, so that the second shift fork 26 is moved along the main fork shaft 27 relative thereto.

For attaining the second speed position, a shifting operation is effected by rotating the shaft 39 in the direction opposite to the direction of rotation in the first speed position. Thus the first shift fork 25 is moved to the left and the sleeve 15a is connected to the counter second gear 11. In this case also, the first shift fork 25 moves as a unit with the main fork shaft 27, as in the case of the first speed position.

For attaining the third speed position, a shifting operation is effected by rotating the neutrally positioned shift and select lever shaft 39 counter-clockwise as viewed in FIG. 2. Thus the second shift fork 26 engaged by the projection B of the first inner lever 41 is moved to the right to connect the sleeve 16a of the second clutch mechanism 16 to the third speed gear 7. Since the shifting operation is effected with the projection C of the second inner lever 42 in engagement with the engaging groove A in the first shift head 37, the second shift fork 26 and main fork shaft 27 are moved as a unit upon the rotation of the lever shaft 39. In this state, the projections 53 and 54 on the interlock plate 49 are held in engagement with the engaging grooves A, A in the first shift fork 25 and the second shift head 38 thereby to hold the shift fork 25 and the shift head 38 immovable. Thus the first shift fork 25 slides along the main fork shaft 27 relative thereto.

For attaining the fourth speed position, a shifting operation is effected by rotating the lever shaft 39 in the direction opposite to that in the third speed position. Thus the second shift fork 26 is moved to the left to connect the sleeve 16a to the fourth speed gear 8. In this case also, the second shift fork 26 moves as a unit with the main shift fork 27 as in the case of the third speed position.

For attaining the fifth speed position, a shifting operation is effected by moving the neutrally positioned shift and select lever shaft 39 forwardly against the force of the return spring 45. Thus the projection B of the first inner lever 41 is brought into engagement with the engaging groove A of the second shift head 38. Then, as a shifting operation is effected by rotating the lever shaft 39 counter-clockwise as viewed in FIG. 2, the third shift fork 30 is moved to the right together with the auxiliary fork shaft 31, so that the sleeve 17a of the third clutch mechanism 17 is connected to the fifth gear 9. In this state, the projection C of the second inner lever 42 is held out of engagement with the engaging groove A of the first shift head 37. The first shift head 37, first shift fork 25 and second shift fork 26 are held immovable since the projections 53 and 54 of the interlock plate 49 are rendered in engagement with the engaging grooves A—A thereof. The reverse shift arm 32 also is held immovable since the one-way pin 36 engages with the engaging groove 34 of the main fork shaft 27 which is held stationary as a unit with the first shift head 37.

Needless to say, the neutral position of the transmission is resumed by reversing the procedure in each case.

For the reversing, a shifting operation is effected by rotating the lever shaft 39 in the direction opposite to that in the fifth speed position. Thus the auxiliary fork shaft 31 is moved to the left and the reverse shift arm 32 is moved as a unit with the shaft, 31 by means of the engaging pin 33, so that the reverse idler gear 20 is brought into engagement with the reverse gear 5 and the counter reverse gear 18 simultaneously. For returning to the neutral position from the reversing position, the reverse shift arm 32 can be reset together with the auxiliary fork shaft 31 to resume the neutral position, since the one-way pin 36 has been brought into engagement with the engaging groove 35 of the auxiliary fork shaft 31 in the course of shifting operation for reversing.

As will be fully understood from the foregoing description, according to the invention, there is provided a transmission manipulation device for manual transmission wherein a plurality of shift forks for respective transmission clutch mechanisms are mounted on a single main fork shaft provided in the main chamber of the transmission case, the main chamber accomodating also a shift and select lever shaft so as to be able to select and shift the shift forks, while the auxiliary chamber of the transmission case accomodates an auxiliary fork shaft extending in parallel with the main fork shaft through the main chamber. A shift fork for the transmission clutch mechanism is fixed to this auxiliary fork shaft such that the auxiliary fork shaft can be operated for selecting and shifting operation by means of the lever shaft. Since each of the main chamber and the auxiliary chambers accomodate only one fork shaft unlike the conventional device in which a plurality of fork shafts are disposed in the main chamber, it is possible to attain, by the so-called fork shaft slide type system, a shift feeling equivalent to that attained by conventional device. In other words, it is possible to simplify the construction of the transmission manipulation device and, hence, to facilitate assembling of the same, while reducing the weight of the transmission as a whole, without losing the good shift feeling attained by the conventional device. The invention can effectively be applied to a transmission in which transmission clutch mechanisms are disposed in both of the main and auxiliary chambers.

Although the invention has been described through specific terms, it is to be noted here that the described embodiment is not exclusive and various changes and modifications may be imparted thereto without departing from the scope of the invention, which is limited solely by the appended claims.

What is claimed is:

1. A transmission manipulation device for use in a manual transmission having a transmission case in which are defined a main chamber and an auxiliary chamber, a plurality of transmission clutch mechanisms mounted in the main chamber and a single transmission clutch mechanism disposed in the auxiliary chamber, said transmission manipulation device comprising: a main fork shaft axially movably mounted in said main chamber; a plurality of shift forks axially movably provided on said main fork shaft and associated with respective transmission clutch mechanisms; engaging portions provided on said shift forks and aligned in a direction perpendicular to said main fork shaft; a shift and select lever shaft rotatably and axially movably disposed in said main chamber to extend in the direction perpendicular to said main fork shaft; a projection provided on said lever shaft and engageable with said engaging portion of any one of said shift forks, said projection of said lever shaft being selectivley engageable with said engaging portion of any one of said shift forks as said lever shaft is moved axially, while rotation of said lever shaft causes movement of any one of said shift forks in the axial direction of said main fork shaft; said main fork shaft and said lever shaft being connected in such a manner that the selected shift fork is movable as a unit with the main fork shaft; an auxiliary fork shaft disposed in said auxiliary chamber in parallel with said main fork shaft through said main chamber; a shift fork associated with the transmission clutch mechanism in said auxiliary chamber and connected to said auxiliary fork shaft; and an engaging portion on said auxiliary fork shaft and arranged in a side-by-side relation to said engaging portions; said projection of said lever shaft being selectively engageable with said engaging portion of said auxiliary fork shaft.

* * * * *